United States Patent [19]

Bäbler et al.

[11] Patent Number: 5,286,863
[45] Date of Patent: Feb. 15, 1994

[54] OXIDATION PROCESS FOR PREPARING QUINACRIDONE PIGMENTS

[75] Inventors: Fridolin Bäbler, Hockessin; Edward E. Jaffe, Wilmington, both of Del.

[73] Assignee: Ciba-Geigy Corporation, Ardsley, N.Y.

[21] Appl. No.: 809,898

[22] Filed: Dec. 18, 1991

Related U.S. Application Data

[63] Continuation-in-part of Ser. No. 748,738, Aug. 22, 1991, abandoned.

[51] Int. Cl.$^5$ .............................................. C09B 48/00
[52] U.S. Cl. .................................... 546/56; 546/49; 106/497
[58] Field of Search ................................... 546/49, 56

[56] References Cited

U.S. PATENT DOCUMENTS

| | | | |
|---|---|---|---|
| 2,821,529 | 1/1958 | Strewe | 546/49 |
| 2,969,366 | 1/1961 | Griswold et al. | 546/49 |
| 3,024,239 | 3/1962 | Caliezi | 546/49 |
| 3,148,075 | 9/1964 | Ehrich | 546/49 |
| 3,160,510 | 12/1964 | Ehrich | 546/56 |
| 3,287,457 | 11/1966 | Higgins | 546/49 |
| 3,475,436 | 10/1969 | Cooper et al. | 546/56 |
| 3,738,988 | 6/1973 | Jackson | 546/49 |
| 4,197,404 | 4/1980 | Johnson | 546/49 |
| 4,247,696 | 1/1981 | Shibata et al. | 546/49 |
| 4,734,137 | 3/1988 | Kasahara et al. | 524/87 |
| 4,783,540 | 11/1988 | Bäbler | 548/453 |
| 4,810,302 | 3/1989 | Funatsu et al. | 106/402 |
| 4,857,646 | 8/1989 | Jaffe | 546/49 |
| 5,093,497 | 3/1992 | Schütze et al. | 546/49 |
| 5,166,206 | 11/1992 | Allen, Jr. | 544/321 |
| 5,194,088 | 3/1993 | Babler et al. | 546/49 |
| 5,223,624 | 6/1993 | Babler et al. | 546/49 |

FOREIGN PATENT DOCUMENTS

| | | |
|---|---|---|
| 0201347 | 11/1986 | European Pat. Off. . |
| 0362690 | 10/1988 | European Pat. Off. . |
| 1210110 | 2/1966 | Fed. Rep. of Germany . |
| 3834748 | 4/1990 | Fed. Rep. of Germany . |
| 1225352 | 6/1960 | France . |
| 1328160 | 4/1963 | France . |
| 1346126 | 12/1963 | France . |
| 44-21856 | 9/1969 | Japan .................................. 546/49 |
| 0094334 | 8/1978 | Japan .................................. 546/49 |
| 0130620 | 10/1979 | Japan .................................. 546/49 |
| 54-130621 | 10/1979 | Japan .................................. 546/49 |
| 54-135821 | 10/1979 | Japan . |
| 55-07474 | 2/1980 | Japan . |
| 55-08102 | 3/1980 | Japan . |
| 55-8547 | 3/1980 | Japan . |
| 56-45512 | 10/1981 | Japan . |
| 57-151655 | 9/1982 | Japan . |
| 59-34737 | 8/1984 | Japan . |
| 59-038991 | 9/1984 | Japan . |
| 60-032850 | 2/1985 | Japan . |
| 60-035055 | 2/1985 | Japan . |
| 60-092245 | 5/1985 | Japan . |
| 61-118460 | 6/1986 | Japan . |
| 61-185568 | 8/1986 | Japan . |
| 61-46501 | 10/1986 | Japan . |
| 61-255964 | 11/1986 | Japan . |
| 62-07474 | 1/1987 | Japan . |
| 63-017103 | 4/1988 | Japan . |
| 63-38375 | 7/1988 | Japan . |
| 63-61979 | 11/1988 | Japan . |
| 1-028070 | 5/1989 | Japan . |

OTHER PUBLICATIONS

Labana et al. Chem. Reviews, vol. 67 pp. 1-18 (1967).
Zerweck, C. A. vol. 64, 1966 16030.

*Primary Examiner*—Donald G. Daus
*Attorney, Agent, or Firm*—Luther A. R. Hall; George R. Dohmann

[57] ABSTRACT

A process for preparing quinacridone pigments comprising oxidizing 6,13-dihydroquinacridone or derivatives thereof at elevated temperatures in the presence of a base, dimethyl sulfoxide medium and a quinone catalyst, drowning the resulting pigment solution to precipitate the quinacridone pigment and isolating the desired quinacridone product.

20 Claims, No Drawings

OXIDATION PROCESS FOR PREPARING QUINACRIDONE PIGMENTS

This application is a continuation-in-part of Ser. No. 07/748,738 filed Aug. 22, 1991, now abandoned.

Quinacridones are a well known class of pigments. A host of patents describe the preparation of linear quinacridones by oxidation of their corresponding 6,13-dihydroquinacridones. U.S. Pat. Nos. 2,821,529, 2,969,366, 3,148,075 and 3,287,457, among others, disclose oxidation methods using aqueous, alcoholic base systems primarily with aromatic nitro compounds, e.g. the sodium salt of nitrobenzene sulfonic acid, or similar oxidizing agents.

Other patents describe oxidation media including quinones such as 2-chloroanthraquinone in a tetramethylenesulfone aqueous base system (U.S. Pat. No. 3,475,436), anthraquinonemonosulfonic acid together with divalent Fe-, Ni- or Co-salts in an aqueous alkaline system (U.S. Pat. No. 3,738,988), or $C_1$–$C_3$ alcohols and aqueous base (JP 53-904334) together with air.

German patent DE 3,834,748 discloses a process whereby dihydroquinacridones are oxidized in a solvent/base system with an oxygen carrier utilizing, for example, anthraquinone-2-sulfonic acid and air as the oxidizing agent in the presence of quarternary ammonium compounds.

In the aforementioned processes, the reactants and resulting products are generally not in solution and consequently must be suspended during the oxidation reaction. The resulting pigments are filtered directly from the reaction mixture. The disadvantages encountered with this approach include incomplete oxidation, long oxidation reaction cycles and particularly the crude nature of the isolated pigments which are relatively large in particle size. Further conditioning steps are therefore required in order to obtain strong transparent counterpart pigments.

Still other patents disclose the use of N-alkyl-2-pyrrolidone (JP 57-119958), or N-methyl-E-caprolactam (JP 57-108162), or a mixture of polar solvents (JP 58-147459) together with base and preferably aromatic nitro compounds such as sodium m-nitrobenzene-sulfonate as the oxidizing agent. Although air or oxygen is mentioned as a potential oxidizing agent, the yields of quinacridones and substituted quinacridones obtained by these processes are not quantitative due to incomplete oxidation or concomitant overoxidation to quinacridonequinone. Furthermore, the use of solvent mixtures and aromatic nitro compounds requires expensive disposition of the organic reduction products which must be disposed of in an ecologically acceptable manner.

Japanese patent 54-135821 discloses the preparation of quinacridone pigments oxidizing pigments by oxidizing 6,13-dihydroquinacridone in dimethylsulfoxide in the presence of water, an alkali and an oxidizing agent such as sodium o-nitrophenoxide, sodium m-nitrobenzenesulfonate, sulfur powder, selenium, iodine or air, to obtain a quinacridone salt solution, which when diluted with a polar solvent or acid yields a finely divided product. Although this process illustrates the advantage of producing quinacridones directly in pigmentary form, it poses disadvantages when air is used as an oxidizing agent due to required long reaction times and particularly due to low yields of quinacridone as a consequence of the formation of quinacridonequinone and the presence of residual unoxidized 6,13-dihydroquinacridone. Furthermore, only unsubstituted quinacridones are noted as being applicable to this method. When using such conventional oxidation procedures, significant differences are encountered in the ease of oxidation of 6,13-dihydroquinacridone and particularly its substituted derivatives. Thus, the latter are considerably more difficult to oxidize, frequently leading to incompletely oxidized crude pigments.

It has now been surprisingly discovered that the direct oxidation of unsubstituted and/or substituted 6,13-dihydroquinacridones to the corresponding quinacridones in final pigmentary form takes place over short reaction times and produces high yields of the resulting quinacridones. In addition, the resulting solutions upon alcoholysis or hydrolysis produce final pigmentary products in an ecologically effective manner, i.e. without use of organic oxidizing agents or surfactants. Thus, virtually no waste products are generated when the oxidation is conducted in dimethyl sulfoxide in the presence of an aqueous base with air or another oxygen-containing gas mixture at temperatures below 100° C., catalyzed by a quinone or quinone derivative, followed by precipitation of the pigment with an alcohol and/or water with or without the presence of acid. In contrast to the difficulties encountered with substituted materials in the prior art approaches, the instant oxidation process is equally effective with substituted and unsubstituted quinacridones. Additionally, particle growth inhibitors can be added directly to the reaction mixture, whereby small particle size, transparent pigments can be directly obtained without resort to the mechanical size reduction operations (e.g. milling) necessarily required with the prior art approaches. It is seen, therefore, that a myriad of benefits are obtainable with the oxidation process of the instant invention.

Accordingly, the present invention relates to the preparation of pigmentary quinacridones of the formula I

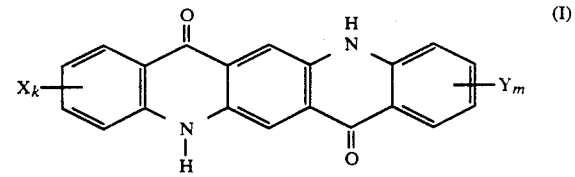

wherein X and Y are independently H, F, Cl, carboxyl, alkyl having 1 to 3 carbon atoms or alkoxy having 1 to 3 carbon atoms, and k and m are integers from 0 to 2, by the oxidation of their corresponding 6,13-dihydroquinacridones of the formula II

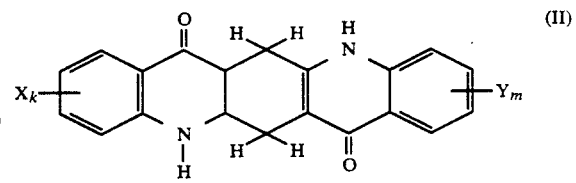

with X, Y, k and m having the aforementioned meanings. Additionally, the dihydroquinacridone precursor materials may be substituted with carboxylic acid ester groups, thereby preparing carboxy-substituted end products.

The process of this invention is particularly suitable for the preparation of quinacridone, 2,9-dichloroquinacridone, 2,9-difluoroquinacridone, 4,11-dichloroquinacridone, 2,9-dicarboxyquinacridone, 3,10-dichloroquinacridone, 2,9-dimethylquinacridone and 2,9-dimethoxyquinacridone, in addition to any other substituted quinacridones that can be prepared by means of the described process from the 6,13-dihydroquinacridones.

Additionally, the process of this invention is also suitable for the preparation of quinacridone solid solutions such, for example, as those described in U.S. Pat. Nos. 3,160,510, 4,783,540 or 4,810,304. Thus, mixtures of unsubstituted dihydro quinacridone and/or differently substituted 6,13-dihydroquinacridones are either co-reacted according to the process of this invention or the pigment solutions of separately oxidized 6,13-dihydroquinacridones are mixed and the solid solution pigment is precipitated according to the present invention.

Dimethyl sulfoxide applicable for use according to the invention is generally present in technical quality in an amount ranging from 3 to 20 times the weight of 6,13-dihydroquinacridone and/or its derivatives and preferably 4 to 10 times the weight thereof.

Bases which prove particularly suitable for this process are, for example, alkali metal hydroxides such as sodium hydroxide and potassium hydroxide. A suitable molar ratio of 6,13-dihydroquinacridone to base is 1:1.9 to 1:7, and preferably a ratio of 1:2.1 to 1:5.5. After the oxidation is completed, the generated salt of the quinacridone is dissolved in the dimethyl sulfoxide phase and excess base, if any, is dissolved in a heavier aqueous phase which can be separated for reuse.

The presence of water during the oxidation step is essential for base solubility in dimethyl sulfoxide. Water is present in an amount of 0.2 to 3 parts, and preferably 0.3 to 2.0 parts, per part of 6,13-dihydroquinacridone and/or its derivatives.

Oxidizing agents include oxygen-containing gas mixtures, for example, oxygen/nitrogen or oxygen/argon mixtures with at least 2% oxygen. Air is preferably used. The oxygen-containing gas mixture is introduced below or above the surface of the reaction mixture. The oxidation reaction is conducted at temperatures below 100° C., preferably 50°-100° C. and most preferably 70°-90° C. Additionally, the oxidation reaction can be conducted under pressure.

The presence of catalytic amounts of quinone and its derivatives during the oxidation reaction results in obtaining high yields of the quinacridone in shorter reaction times. The presence of the catalyst and the use of indicated reaction temperatures and other variables result in quinacridone products which are substantially devoid of over-oxidation products such as quinacridonequinones which adversely affect the intensity of the resulting quinacridone product.

Particularly suitable quinone catalysts are, for example, anthraquinone and its derivatives such as mono and/or dichloroanthraquinone- and most preferably anthraquinone-2-sulfonic acid and/or 2,6-disulfonic acid-derivatives. The quinone catalyst is present in an amount ranging from 0.005 to 0.15 times the weight of 6,13-dihydroquinacridone or derivative, and most preferably 0.01 to 0.09 times the weight.

Several precipitation methods are available for generation of the oxidized quinacridone and/or its derivatives from the pigment salt solution. In a preferred procedure, the reaction mixture is drowned into an alcohol such as methanol, ethanol, n-propanol, iso-propanol, n-butanol and its isomers and/or water.

In another applicable procedure, the quinacridone pigment is precipitated by adding an alcohol and/or water to the reaction mixture. Furthermore, precipitation can be initiated with the use of acids such as dilute hydrochloric-, phosphoric-, and sulfuric acids or organic acids such as acetic acid, optionally in conjunction with organic solvents, or by the direct introduction of hydrogen chloride gas into the reaction mixture.

Depending on the selected precipitation conditions, a transparent, small particle size ($<0.1$ $\mu$m) or an opaque large particle size ($>0.2$ $\mu$m) pigment form can be obtained. As previously noted, the ability to directly obtain transparent, small particle size pigments without the need for mechanical size reduction operations is a decided benefit. Furthermore, it is possible to conduct the precipitation in such a manner that selected crystal modifications of the quinacridones can be obtained. Such polymorphic modifications are known and have been described, for example, in Chemical Reviews, 67, 1, 1-18 (1967). In general, more opaque pigments are generated when an alcohol is chosen as the precipitation medium and the resulting pigment suspension is stirred for 1 to 24 hours at atmospheric or higher pressures and temperatures of 40° C. or higher.

The particle size of the pigment is controlled by varying the time and temperature of the treatment in the basic solvent mixture. A greater degree of particle size control, particularly for small particle size pigments, can be exercised by adding particle growth inhibitors such as sulfonic acid, phthalimidomethyl-, imidazolylmethyl-, pyrazolylmethyl-, N-(diakylaminoalkyl)sulfonic acid amide derivatives of the quinacridone. Such particle growth inhibitors may also act under certain conditions as crystal phase directors. Particle growth inhibitors, also known as antiflocculating agents, are well known and described, for example, in U.S. Pat. Nos. 3,386,843, 4,310,359, 4,692,189, EP 321-397-A, EP 321-919-A, and EP 362-690-A.

The particle growth inhibitors are added in amounts ranging from 0.05 to 15%, preferably 1 to 8%, and most preferably 2 to 5% based on the corresponding pigment, either after but preferably, before the precipitation of the oxidized pigment. They can additionally serve to lessen or avoid flocculation, increase pigment dispersion stability and positively affect rheological characteristics.

When the ripening of the pigment crystals is complete, the pigment in its desired pigmentary form is isolated by filtration, with the presscake being washed with water or an organic solvent, preferably methanol, followed by water and dried.

Depending on the end use, it can be advantageous to add specific amounts of texture improving agents to the pigment. Suitable texture improving agents are, in particular, fatty acids of not less than 18 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecane-1,2-diol, and also modified colophonium/-maleate resins or fumaric acid/colophonium resins or polymeric dispersants. The texture improving agents are preferably added in amounts of 0.1 to 30%, by weight, most preferably 2 to 15% by weight, based on the final product.

The compositions of this invention are suitable for use as pigments for coloring high molecular weight organic materials. Examples of high molecular weight organic materials which may be colored or pigmented with the compositions of this invention are cellulose ethers and esters such as ethylcellulose, nitrocellulose, cellulose acetate, cellulose butyrate, natural resins or synthetic resins such as polymerization resins or condensation resins, for example aminoplasts, in particular urea/formaldehyde and melamine/formaldehyde resins, alkyd resins, acrylic resins, phenolic plastics, polycarbonates, polyolefins, polystyrene, polyvinyl chloride, polyamides, polyether, polyetherketone, polyurethanes, polyesters, rubber, casein, silicone and silicone resins, singly or in mixture.

The above high molecular weight compounds may be used singly or as mixtures in the form of plastics, melts or of spinning solutions, varnishes, paints or printing inks. Depending on the end use, it is advantageous to use the pigments as toners or in the form of preparations. The compositions of the invention are preferably employed in an amount of 0.1 to 30% by weight based on the high molecular organic material to be pigmented.

Pigmentation of high molecular weight organic compounds with the pigments of the invention is carried out, for example, by incorporating such pigments, optionally in the form of a masterbatch, into the substrates using roller mills, mixing or grinding machines. The pigmented material is then brought into the desired final form by methods which are known per se, for example, calendering, molding, extruding, coating, spinning, casting or by injection molding. It is often desirable to incorporate plasticizers into the high molecular compounds before processing in order to produce non-brittle moldings or to diminish their brittleness. Suitable plasticizers are, for example, esters of phosphoric acid, phthalic acid or sebacic acid. The plasticizers may be incorporated before or after working the composition into the polymers. To obtain different shades, it is also possible to add fillers or other chromophoric components such as white, colored or black pigments, in any amount, to the high molecular weight organic compounds, in addition to the compositions of this invention.

For pigmenting varnishes and printing inks, the high molecular weight organic materials and the pigments obtained according to the present invention, together with optional additives such as fillers, other pigments, siccatives or plasticizers, are finely dispersed or dissolved in a common organic solvent or mixture of solvents. The procedure may be such that the individual components or blends thereof are dispersed or dissolved in the solvent and subsequently all the components are mixed.

It is also to be noted that the instant oxidation process using molecular oxygen, for example air, as the oxidizing agent, catalytic amounts of quinone derivatives and easily recoverable organic solvents is both ecologically and economically attractive.

The present invention also relates to a new process for preparing a distinct hitherto unknown exceptionally yellowish red γ-form of quinacridone, which is designated as "γIII" form, by the direct oxidation of 6,13-dihydroquinacridone to quinacridone in the presence of a basic dimethyl sulfoxide medium and an oxidizing agent and the use of catalytic amounts of an anthraquinone derivative followed by precipitation of the pigment by methanol (preferably at temperatures below about 40° C.). The variables disclosed hereinabove are applicable to this process, Example 1A further disclosing the preferred embodiments. The new gamma form shows a distinctive X-ray diffraction pattern. In comparison to the known γI and γII forms, the new γIII form shows a significant change in the region of 13 to 14.5° 2 theta double glancing angle as well as a shift of some bands to longer double glancing angles. It is more fully described and claimed in copending applications U.S. Pat. No. 5,223,624 which is fully incorporated herein.

The following examples further illustrate the preferred embodiments of this invention. In these examples, all parts given are by weight unless otherwise noted.

EXAMPLE 1A

A 500 ml flask equipped with a thermometer, stirrer, condenser and gas inlet tube is charged with 10 grams 6,13-dihydroquinacridone and 120 ml dimethyl sulfoxide. Thereafter, 14 grams 50% aqueous sodium hydroxide solution, 10 ml water and 0.6 grams anthraquinone-2-sulfonic acid sodium salt monohydrate are added to the suspension. Air is introduced slowly (90-96 ml/min.) over the surface of the stirred reaction mixture via the gas inlet tube, and the mixture is then heated to 82° C. and kept for 50 minutes at that temperature with stirring and air flow. The resulting hot, deep blue solution of the pigment salt is drowned into 500 ml methanol at 18°-20° C. causing the red quinacridone pigment to precipitate and the temperature to rise to 40° C. The pigment suspension is stirred at 40° C. for 6 hours. The pigment is isolated by filtration and is washed dimethyl sulfoxide-free with methanol followed by water to a pH 7.5-8.0 and dried. The pigmentary quinacridone in a yield of 9.6 grams contains less than 0.1% 6,13-dihydroquinacridone and less than 0.1% quinacridonequinone, as determined by spectrophotometric methods.

Its X-ray diffraction pattern, measured on a RIGAKU GEIGERFLEX Diffractometer Type D/Max II V BX, shows a gamma quinacridone with bands in terms of interplanar spacing and corresponding double glancing angles as follows:

| interplanar spacings d-value in angstrom | intensity | double glancing angles degree 2 theta |
| --- | --- | --- |
| 13.2 | strong | 6.7 |
| 6.7 | strong | 13.3 |
| 6.5 | medium | 13.6 |
| 6.3 | strong | 14.0 |
| 5.2 | weak | 17.2 |
| 4.3 | weak | 20.6 |
| 4.0 | weak | 21.9 |
| 3.7 | weak | 24.0 |
| 3.5 | weak | 25.3 |
| 3.3 | strong | 26.6 |
| 3.2 | weak | 28.1 |
| 3.1 | weak | 28.8 |

By rubout according to ASTM method D-387-60 in lithographic varnish, the pigment shows an opaque yellowish-red masstone and a strong red color in $TiO_2$ extension. When incorporated into plastics or paints, the pigment imparts a yellowish red color with excellent fastness properties.

EXAMPLE 1B

Comparative Example

The oxidation of 6,13-dihydroquinacridone is carried out as described in the Japanese Patent Disclosure JP 54-135821, Example 5. Thus, 10 grams 6,13-dihydroquinacridone are stirred into a mixture of 100 ml dimethyl sulfoxide and 20 grams 33% aqueous potassium hydroxide solution at 110° to 120° and air is then introduced into the vessel at a rate of 90–96 ml/min. for a period of 5 hours. The reaction mixture is cooled and 33% aqueous sulfuric acid is introduced dropwise. The precipitated pigment is filtered and the presscake washed dimethyl sulfoxide-free with water to pH 6 and dried yielding 9.1 grams of a quinacridone pigment. A spectrophotometric analysis shows the product to consist of 0.8% 6,13-dihydroquinacridone, 17.2% of undesirable quinacridonequinone and 78.3% quinacridone. When incorporated into paints or plastics, the pigment shows a dirty red color. Its X-ray diffraction pattern shows the main peaks of known gamma quinacridone and quinacridonequinone.

The pigmentary quality of the products obtained according Examples 1A and 1B are compared by rubout readings. Rubouts are prepared in lithographic varnish with a Hoover Muller. The apparatus is equipped with a ½ HP 110–220 V, 60 cycle motor and two glass plates. The muller can be adjusted to stop after 25, 50, 75, or 100 revolutions with 50 revolutions being considered normal. Three weights are used which apply 150 pounds pressure between the plates. In each case, 0.6 grams of dry pigment and 1.2 grams of a lithographic varnish drier are mixed with a spatula on the lower glass plate, and the motor is set to stop after fifty revolutions. The plates are separated and the pigment in ink dispersion is picked up and spread out again on the lower plate and the operation repeated six more times. The resulting pigment as an ink dispersion, referred to as the masstone ink, is drawn down versus an appropriate control prepared in the identical manner. In order to assess color strengths of the samples, calculated amounts of the masstone ink (0.18 grams) and a zinc oxide past dispersion (10 grams) are weighed accurately and mixed with a spatula on a polished glass plate.

Using a color spectrophotometer with D-65 illuminant, C.I.E. lab scale and 10 degree observer with specular component included, the L,A,B color space values of masstone as well as tint rubouts are measured. In addition, the total color difference values (ΔE) are determined based on measured data from Example 1A versus that of Example 1B:

|  | Masstone | | | | Tint | | | |
| --- | --- | --- | --- | --- | --- | --- | --- | --- |
|  | L | A | B | ΔE | L | A | B | ΔE |
| Example 1A | 40.2 | 40.9 | 20.8 | — | 63.9 | 39.1 | −6.1 | — |
| 1B | 34.7 | 37.6 | 14.3 | 15.7 | 62.9 | 35.3 | 0.7 | 7.9 |

Thus, the pigment of Example 1A is seen to be much yellower, lighter and higher in masstone chroma than the sample of Example 1B, as reflected in its higher L, A and B color values and also much lighter and brighter in tint as reflected in its L and A values.

EXAMPLE 2A

The procedure of Example 1A is repeated using 0.6 grams of anthraquinone-2,6-disulfonic acid disodium salt instead of anthraquinone 2-sulfonic acid sodium salt as the catalyst for the oxidation reaction to yield 9.6 grams quinacridone exhibiting the distinctive X-ray diffraction pattern of a new gamma quinacridone as described in Example 1A with comparably good analysis for quinacridone content.

EXAMPLE 2B

The procedure of Example 1A is repeated using 8.3 grams 45% aqueous potassium hydroxide instead of 14 grams 50% aqueous sodium hydroxide, 8 ml water and 70–80 ml/min air introduction to yield 9.6 grams of the new gamma quinacridone showing the distinctive X-ray diffraction pattern of a gamma quinacridone and comparably good fastness properties.

EXAMPLE 2C

The procedure of Example 2B is repeated with the exception that 7.6 grams 50% aqueous sodium hydroxide is utilized to yield 9.5 grams of the new gamma quinacridone showing the distinctive X-ray diffraction pattern of a gamma quinacridone and comparably good pigmentary properties.

EXAMPLE 3A

A 2 liter flask equipped with a thermometer, stirrer, condenser and gas inlet tube is charged with 50 grams 6,13-dihydroquinacridone and 600 ml dimethyl sulfoxide, followed by 70 grams 50% aqueous sodium hydroxide, 50 ml water and 3.0 grams anthraquinone-2-sulfonic acid sodium salt monohydrate. Air is introduced via the gas inlet tube, at a rate of 175–185 ml/minute over the surface of the stirred reaction mixture, which is heated to 82° C. and kept at that temperature for 1½ hours with stirring and air flow. The resulting hot deep blue solution of the pigment salt is drowned into 2.5 liters methanol at 20° C., causing the red quinacridone to precipitate and the temperature to rise to 40° C. The pigment suspension is heated to reflux (72° C.) and refluxed for 3 hours. The pigment is isolated by filtration and washed dimethyl sulfoxide-free with methanol, followed by water to pH 7.5–8.0 and dried. The yield of the pigmentary quinacridone is 48 grams, with less than 0.1% 6,13-dihydroquinacridone and less than 0.1% quinacridonequinone as determined by spectrophotometric methods.

The X-ray diffraction pattern of the product is consistent with that of the gamma quinacridone described in Example 1A. When incorporated into plastics or paints, the pigment imparts an opaque yellowish-red color with excellent fastness properties.

EXAMPLE 3B

The procedure of Example 3A is repeated with the exception that the resulting deep blue solution of pigment salt is diluted with 300 ml methanol whereby the temperature decreases from 82° C. to 73° C. and the resulting mixture is drowned into 2 liters methanol having a temperature of 25° C. The process yields 47.5 grams quinacridone having less than 0.1% 6,13-dihydroquinacridone and less than 1.0% quinacridonequinone and exhibiting the X-ray diffraction pattern of a β-quinacridone pigment. The violet pigment exhibits excellent pigmentary properties when incorporated into plastics.

EXAMPLE 4

The procedure described in Example 3A is repeated, with the exception that the resulting deep blue solution of pigment salt is drowned into a mixture of 1000 ml methanol, 68 ml water and 36 grams concentrated sulfuric acid. The resulting red pigment suspension of pH 9.0 to 9.8 is stirred at 60° C. for 6 hours. The pigment is isolated by filtration and washed dimethyl sulfoxide-and-salt-free with water to a pH 7.5 and dried. The pigmentary quinacridone is recovered in a yield of 47.8 grams and contains less than 0.1% dihydroquinacridone and less than 0.5% quinacridonequinone as determined by a spectrophotometric method. Its X-ray diffraction pattern shows it to be a mixture of an α- and γ-quinacridone. When incorporated into plastics or paints, the pigment imparts an opaque yellowish-red color with excellent fastness properties.

EXAMPLE 5

The procedure described in Example 1A is repeated with the exception that 43 grams 20% aqueous sulfuric acid are slowly added at 40°-50° C. via a dropping funnel to the deep blue solution of the pigment salt. The resulting red pigment suspension is diluted with 100 ml water and stirred for 1 hour at 50° C. The pigment is isolated by filtration and washed dimethyl sulfoxide-, salt- and acid-free with water and dried. The red pigment shows an X-ray diffraction pattern of the known α-quinacridone.

EXAMPLE 6

A 500 ml flask equipped with a thermometer, stirrer, condenser and gas inlet tube is charged with 10 grams 6,13-dihydroquinacridone and 120 ml dimethyl sulfoxide, followed by 14 grams 50% aqueous sodium hydroxide, 10 ml water and 0.6 grams anthraquinone-2-sulfonic acid sodium salt monohydrate. Air is introduced slowly (90-96 ml/minutes) over the surface of the stirred reaction mixture via the gas inlet tube and the mixture is heated to 82° C. and kept for 45 minutes at that temperature with stirring and air flow. A quarter of a gram of 2-phthalimidomethyl-quinacridone is added as a particle growth inhibitor and the reaction mixture is further stirred under air flow for 5 minutes at 82° C. The deep blue reaction mixture is drowned into 500 ml methanol and the resulting pigment suspension stirred for 6 hours at 40°-45° C. The pigment is isolated by filtration and washed dimethyl sulfoxide-free with methanol followed by water to a pH 7.5 and then dried. The yield of the small particle size quinacridone pigment is 9.7 grams, the pigment containing less than 0.5% dihydroquinacridone and less than 0.7% quinacridonequinone.

The resulting pigment exhibits an X-ray diffraction pattern reflecting primarily γ-quinacridone in mixture with some β-quinacridone. The pigment shows a maroon color tone when incorporated into a paint system and exhibits excellent light and weatherfastness properties.

EXAMPLE 7

A 2 liter flask equipped with a thermometer, stirrer, condenser and gas inlet tube is charged with 61 grams of 2,9-dichloro-6,13-dihydroquinacridone and 600 ml dimethyl sulfoxide, followed by 70 grams 50% aqueous sodium hydroxide, 50 ml water and 1.5 grams anthraquinone-2-sulfonic acid sodium salt monohydrate. Air is introduced at a rate of 175-185 ml/minute over the surface of the stirred reaction mixture via the gas inlet tube, which is heated to 82° C. and kept for 1 hour 55 minutes at this temperature with stirring and air flow. The resulting black blue solution of the pigment salt is drowned into 1600 ml water and the precipitated magenta pigment is stirred for 5 hours at 60° C. The pigment is isolated by filtration and washed dimethyl sulfoxide-free with methanol followed by water to pH 7.5-8.0 and dried. The yield of the pigmentary 2,9-dichloroquinacridone is 58.2 grams, the product containing less than 0.1% 2,9-dichloro-6,13-dihydroquinacridone and less than 0.1% 2,9-dichloroquinacridonequinone determined by a spectrophotometric method. The product shows an X-ray diffraction pattern of γ-2,9-dichloroquinacridone. When incorporated into plastics or paints, this pigment imparts a strong, highly saturated magenta color with excellent light, weather and heatfastness properties.

EXAMPLE 8

The procedure of Example 7 is repeated, with the introduction of the air at a rate of 175-185 ml/minute occurring below the surface of the reaction mixture instead of above the surface and with the reaction being carried out in 1 hour 45 minutes instead of 1 hour and 55 minutes at 82° C. A 2,9-dichloroquinacridone pigment is obtained with crystallographic, coloristic and fastness properties comparable to that of the product of Example 7.

EXAMPLE 9

The procedure of Example 7 is repeated with the exception that the black blue solution of the 2,9-dichloroquinacridone pigment salt is drowned into a mixture of 800 ml methanol, 36 grams concentrated sulfuric acid and 50 ml water. The resulting magenta pigment suspension having a pH of 9.0 to 9.8 is stirred for 3 hours at reflux. The pigment is isolated by filtration, washing neutral and salt free with methanol followed by hot water and then drying. The resulting large particle size 2,9-dichloroquinacridone has a specific surface area of 31 m$^2$/g and demonstrates strong bluish-red coloration with excellent heat, light and weatherfastness when incorporated into paints and plastics.

EXAMPLE 10

A 2 liter flask equipped with a thermometer, stirrer, condenser and gas inlet tube is charged with 61 grams of 2,9-dichloro-6,13-dihydroquinacridone and 600 ml dimethylsulfoxide followed by 70 grams 50% aqueous sodium hydroxide, 50 ml water and 1.5 grams anthraquinone-2-sulfonic acid sodium salt monohydrate. Air is introduced at a rate of 175-185 ml/minute over the surface of the stirred reaction mixture via the gas inlet tube and the mixture is heated to 82° C. and kept for 1 hour and 50 minutes at this temperature with stirring and gas flow. 1.8 grams quinacridone monosulfonic acid are added and the reaction mixture is stirred under air flow for a further 5 minutes at 82° C. The resulting black blue reaction mixture is drowned into 2.5 liters methanol and the precipitated magenta pigment is stirred for one hour at 40° C. The pigment is isolated by filtration and is then washed dimethyl sulfoxide-free with methanol followed by water to pH 7.5-8.0 and dried. The resulting small particle size 2,9-dichloroquinacridone is recovered in a yield of 58.5 grams containing less than 0.1% 2,9-dichloro-6,13-dihydroquinacridone and less than 0.3% 2,9-dichloroquinacridonequinone determined by a spectrophotometric method. It exhibits the X-ray diffraction pattern of a γ-2,9-dichloroquinacridone.

In comparison to MONASTRAL RT-235-D, a commercial 2,9-dichloroquinacridone from CIBA-GEIGY Corp. which has a specific surface area of 67 $m^2/g$, the pigment obtained according to Example 10 shows a specific surface area of 72 $m^2/g$, thereby demonstrating the preparation of a small particle size 2,9-dichloroquinacridone in pigmentary from. Upon incorporation into paint, the pigment imparts a strong magenta coloration with excellent light and weatherfastness properties.

EXAMPLE 11

A 2 liter flask equipped with a thermometer, stirrer, condenser and gas inlet tube is charged with 55 grams 2,9-dimethyl-6,13-dihydroquinacridone and 600 ml dimethyl sulfoxide, followed by 70 grams of 45% aqueous potassium hydroxide solution, 50 ml water and 1.5 grams anthraquinone-2-sulfonic acid sodium salt monohydrate. Air is introduced at a rate of 175-185 ml/minute over the surface of the stirred reaction mixture via the gas inlet tube. The mixture is heated to 82° C. and kept at this temperature for 1 hour and 55 minutes with stirring and air flow. The resulting dark blue reaction mixture is drowned into 2.5 liters methanol and the precipitated magenta pigment is stirred for 2 hours at reflux temperature. The pigment is isolated by filtration and washed dimethyl sulfoxide-free with methanol, followed by water to pH 7.5-8.0 and dried. The pigmentary 2,9-dimethylquinacridone product is recovered in a yield of 52 grams and exhibits a surface area of 38.8 $m^2/g$. It contains less than 0.1% 2,9-dimethyl-6,13-dihydroquinacridone and less than 0.1% 2,9-dimethyl-quinacridonequinone as determined by a spectrophotometric method. The resulting pigment shows strong bluish-red coloration with excellent heat, light and weather fastness properties when incorporated into paints and plastics.

EXAMPLE 12

The procedure of Example 11 is repeated with the exception that the oxidation reaction is carried out by conducting air over the surface at a rate of 175-185 ml/minute at 82° C. over a one hour 50 minute period, followed by the addition of 1.5 grams aluminum quinacridone monosulfonate and further stirring under air flow for 5 minutes at 82° C. The resulting dark blue solution is drowned into 2.5 liters methanol at a temperature below 40° C. and the precipitated magenta pigment is stirred for 1½ hours at 40° C. The pigment is isolated by filtration and washed dimethyl sulfoxide-free with methanol followed by water to pH 7.5-8.0.

Thereafter, 240 grams of the washed presscake showing a pigment content of 20% by weight, is blended in a lab OSTERIZER blender with 600 ml water, 1.0 gram quinacridonemonosulfonic acid and 1.0 gram 2-(3,5-dimethyl-1-pyrazolmethyl)-quinacridone. The blend is filtered, washed with water and dried. The resulting small particle size 2,9-dimethylquinacridone pigment shows excellent rheological characteristics when incorporated into a paint system and a strong, highly saturated magenta coloration with outstanding weatherfastness properties. The specific surface area of the product is 60.6 $m^2/g$, demonstrating the pigmentary nature of the material obtained from the process.

EXAMPLE 13

The procedure of Example 1A is repeated using 12.2 grams 4,11-dichloro-6,13-dihydroquinacridone instead of 10 grams 6,13-dihydroquinacridone to yield 10 grams of 4,11-dichloroquinacridone which imparts scarlet coloration when incorporated into paints or plastics.

EXAMPLE 14

The procedure of Example 1A is repeated using 11 grams 2,9-difluoro-6,13-dihydroquinacridone instead of 10 grams 6,13-dihydroquinacridone and the precipitated pigment is stirred for 8 hours instead of 6 hours at 40° C. to yield 9.5 grams of 2,9-difluoroquinacridone containing less than 0.5% 2,9-difluoro-6,13-dihydroquinacridone and less than 0.5% 2,9-difluoroquinacridonequinone.

When incorporated into plastics or paints, the pigment imparts strong magenta coloration with excellent fastness properties.

EXAMPLE 15

The procedure of Example 14 is repeated with the exception that 18 grams 50% aqueous sulfuric acid are added via a dropping funnel to the completely oxidized reaction mixture. The precipitated magenta pigment suspension is further diluted with 100 ml water and stirred at 60° C. for 3 hours. The pigment is isolated by filtration, washed dimethyl sulfoxide-, acid-and-salt free with hot water and dried to yield a 2,9-difluoroquinacridone with comparable good coloristic and fastness properties.

EXAMPLE 16

A 500 ml flask equipped with a thermometer, stirrer, condenser and gas inlet tube is charged with 12.9 grams 2,9-dicarbethoxy-6,13-dihydroquinacridone and 120 ml dimethyl sulfoxide followed by 14 grams 50% aqueous sodium hydroxide, 10 ml water and 0.6 grams anthraquinone-2-sulfonic acid sodium salt monohydrate. Air is introduced slowly (90-96 ml/minute) over the surface of the stirred reaction mixture via the gas inlet tube, which mixture is thereafter heated to 82° C. and kept for 60 minutes at this temperature with stirring and air flow. 45 grams 20% aqueous sulfuric acid are added to the resulting deep black solution via a dropping funnel at a temperature of 40°-60° C. The precipitated pigment suspension is stirred for 1 hour at 60° C. The pigment is isolated by filtration and washed dimethyl sulfoxide-, salt-and-acid-free with methanol and hot water and dried to yield 9.5 grams 2,9-dicarboxyquinacridone of high purity.

EXAMPLE 17

The procedure of Example 10 is repeated with the exception that a mixture of 55 grams 2,9-dichloro-6,13-dihydroquinacridone and 6 grams 6,13-dihydroquinacridone is used instead of 61 grams 2,9-dichloro-6,13-dihydroquinacridone and 1.8 grams aluminum quinacridone sulfonate are introduced as particle growth inhibitor, yielding a solid solution pigment with a 2,9-dichloroquinacridone X-ray diffraction pattern. In paint, the resulting pigment imparts strong magenta coloration with excellent weatherfastness properties. The specific surface area of 72.7 $m^2/g$ demonstrates the pigmentary nature of the material.

EXAMPLE 18

The procedure of Example 1A is repeated with the exception that a mixture of 6 grams 6,13-dihydroquinacridone and 4 grams 2,9-dichloro-6,13-dihydroquinacridone is used instead of 10 grams 6,13-dihydroquinacridone and the precipitated pigment suspension is stirred for 2½ hours at 40° C. instead of 6 hours, to yield a solid solution pigment with a unique X-ray diffraction pattern. After incorporation into paint and plastics, the pigment solid solution imparts strong, highly saturated bluish-red coloration with excellent light, heat and weatherfastness properties.

EXAMPLE 19

A 500 ml flask equipped with a thermometer, stirrer, condenser and gas inlet tube is charged with 12 grams 2,9-dimethoxy-6,13-dihydroquinacridone and 120 ml dimethyl sulfoxide, followed by 14 grams 50% aqueous sodium hydroxide, 10 ml water and 0.3 grams anthraquinone-2-sulfonic acid sodium salt monohydrate. Air is introduced slowly (90-96 ml/minute) over the surface of the reaction mixture via the gas inlet tube, which mixture is heated to 82° C. and kept for 55 minutes at this temperature with stirring and air flow. The resulting hot deep blue solution of the generated pigment salt is drowned into 500 ml water at 20°-22° C., causing the 2,9-dimethoxyquinacridone pigment to precipitate and the temperature to rise to 42° C. The pigment suspension is stirred at 40°-45° C. for 2 hours. The pigment is isolated by filtration and washed dimethyl sulfoxide-free with methanol followed by water to pH 7.5-8.0 and dried. The yield of the pigmentary 2,9-dimethoxyquinacridonequinacridone is 10.5 grams and contains less than 0.1% 2,9-dimethoxyquinacridonequinone as determined by a spectrophotometric method. By rubout in lithographic varnish, the pigment shows a transparent, very strong violet masstone coloration.

EXAMPLE 20

A 500 ml flask equipped with a thermometer, stirrer, condenser and gas inlet tube is charged with 6.35 hrams 6,13-dihydroquinacridone, 3.65 grams 4,11-dichloro-6,13-dihydroquinacridone, 0.6 grams anthraquinone-2-sulfonic acid sodium salt monohydrate, and 100 ml dimethyl sulfoxide, followed by 14 grams 50% aqueous sodium hydroxide and 10 ml water. Air is introduced slowly (80 ml/minute) over the surface of the stirred reaction mixture via the gas inlet tube and the mixture is heated to 82° C. and kept for 50 minutes at that temperature with stirring and air flow. The reaction mixture is cooled to 20°-25° C. and drowned into 500 ml methanol. The precipitated pigment is stirred for three hours at reflux temperature. The pigment is filtered, washed dimethyl sulfoxide-free with methanol, followed by water and then dried, yielding 9 grams of an orange colored solid solution pigment having an X-ray diffraction pattern which differs from the X-ray diffraction pattern of a corresponding physical mixture of quinacridone and 4,11-dichloroquinacridone.

EXAMPLE 21

The procedure of Example 1A is repeated using 10.9 grams 4,11-dimethyl-6,13-dihydroquinacridone and refluxing the precipitated pigment suspension for 3 hours to yield 9.2 grams 4,11-dimethylquinacridone in high purity. The pigment imparts an opaque reddish-orange color when incorporated into paints or plastics.

EXAMPLE 22

The procedure of Example 17 is repeated using a mixture of 39.6 grams 6,13-dihydroquinacridone and 15.4 grams 2,9-dimethyl-6,13-dihydroquinacridone to yield a solid solution pigment. The resulting pigment imparts a strong magenta coloration with excellent weatherfastness properties when incorporated into paints.

EXAMPLE 23

A mixture of 63.0 grams of polyvinylchloride, 3.0 grams epoxidized soya bean oil, 2.0 grams of barium/cadium heat stabilizer, 32.0 grams dioctylphthalate and 1.0 gram of the 2,9-dichloroquinacridone prepared according to Example 7 is prepared in a glass beaker using a stirring rod. The mixture is formed into a soft PVC sheet with a thickness of 0.4 mm by rolling for 8 minutes on a two-roll laboratory mill at a temperature of 160° C., a roller speed of 25 rpm and friction of 1:1.2 by constant folding, removal and feeding. The resulting soft PVC sheet is colored in a tinctorially strong bluish-red shade with excellent fastness to heat, light and migration.

EXAMPLE 24

Five grams of the new gamma quinacridone prepared according to Example 1A, 2.5 grams CHIMASORB 944 LD (hindered amine light stabilizer), 1.0 gram TINUVIN 328 (benzotriazole UV absorber), 1.0 gram IRGANOX 1010 (hindered phenol antioxidant) and 1.0 gram IRGAFOS 168 (phosphite process stabilizer) (all additives from CIBA-GEIGY Corp.) are mixed in a BANBURY mixer together with 1000 grams high density polyethylene (MA-778, QUANTUM CHEMICALS) at a speed of 175-200 rpm and a total residence time of approximately three minutes. The fluxed pigmented resin is chopped up while warm and malleable, and then fed through a granulator. The resulting granules are molded on a BATTENFELD 1000 injection molder with a 5 minute dwell time and a 30 second cycle time at temperatures of 205° C., 260° C. and 315° C., respectively.

For comparison purposes, commercial gamma quinacridones (MONASTRAL Red RT-759-D from CIBA-GEIGY Corp. and HOSTAPERM Red E3B from HOECHST) are incorporated in a similar manner as described above.

A color spectrophotometer with D-65 illuminant, C.I.E. lab scale and 10 degree observer with specular component included is used to measure the L,A,B color space values of the above prepared chips at 205° C. In addition, the total color difference values (ΔE) of chips molded at 260° C. and 315° C. are measured versus chips molded at 205° C. The values are noted in the following table.

| Pigment | Chips at 205° C. | | | ΔE vs. Chips molded at 205° C. | |
|---|---|---|---|---|---|
| | L | A | B | 260° C. | 315° C. |
| New gamma quinacridone | 43.8 | 44.7 | 24.9 | 0.6 | 1.2 |
| MONASTRAL Red RT-759-D | 41.4 | 44.7 | 21.1 | 0.7 | 1.6 |
| HOSTAPERM Red E3B | 42.7 | 43.3 | 23.2 | 1.3 | 3.3 |

The lighter and yellower colortone of the new gamma quinacridone versus the commercial counterparts is demonstrated by the L and B color space values. Additionally, the lower ΔE values indicative of reduced color change manifest the higher heat stability of the new gamma quinacridone.

EXAMPLE 25

A mixture of 100 grams polyethylene terephthalate granules and 0.5 grams 2,9-difluoroquinacridone pigment obtained according to Example 14 can be blended for 15 minutes in a glass bottle on a roller gear bed. Extrusion of the mixture into a ribbon in a laboratory extruder will produce a ribbon colored in a uniform bluish-red color of excellent light and heat fastness.

EXAMPLE 26

The procedure of Example 24 can be repeated using CYCOLAC-T-1000 acrylonitrile-butadiene-styrene granules (GENERAL ELECTRIC) as the substrate and the 2,9-dichloroquinacridone obtained according to Example 9 instead of gamma quinacridone to yield bluish-red colored chips exhibiting excellent heat and lightfastness properties.

EXAMPLE 27

The procedure of Example 24 can be repeated using MOPLEN 850G polypropylene granules (MONTEDISON) as the substrate and the 2,9-dimethylquinacridone obtained according to Example 11 instead of gamma quinacridone to yield magenta colored chips which show excellent heat and lightfastness properties.

EXAMPLE 28

Six grams of the 2,9-dimethylquinacridone prepared according to Example 12 can be stirred into 20 grams of a mixture of the following composition: 50 grams of a mixture of aromatic hydrocarbons (SOLVESSO 150-ESSO), 15 grams of butylacetate, 5 grams of ketoxime-based leveling agent, 25 grams of methyl isobutyl ketone and 5 grams of silicone oil (1% in SOLVESSO 150). Upon complete dispersion, 48.3 grams of acrylic resin (51% in 3:1 xylene/butanol) (BAYCRYL L 530-BASF) and 23.7 grams of melamine resin (MAPRENAL TTX-HOECHST-55% in butanol) are added, the batch briefly homogenized in a horizontal bead mill under shear and the resultant coating composition sprayed onto a metal sheet and stoved for 30 minutes at 130° C. The finish so obtained will exhibit a magenta shade of excellent fastness properties, with the enamel being distinguished by good flow properties and excellent dispersion of the pigment.

EXAMPLE 29

The following ingredients can be thoroughly milled for 96 hours in a ball mill:

| | |
|---|---|
| 25.2 grams | polyester resin, 60% in SOLVESSO 150, (DYNAPOL H700-DYNAMIT NOBEL) |
| 2.7 grams | melamine resin, 55% in butanol, (MAPRENAL MF-650-HOECHST) |
| 15.5 grams | cellulose acetobutyrate (25% in xylene/butyl acetate 1:2) |
| 1.1 grams | catalyst based on mineral oil/carboxylate (IRGASOL TZ6-CIBA-GEIGY AG) |
| 23.3 grams | butyl acetate |
| 11.6 grams | xylene |
| 1.6 grams | SOLVESSO 150 (ESSO) |
| 9.6 grams | the 2,9-dichlorquinacridone obtained according to Example 10 |

The coating resulting from diluting the pigment dispersion with a mixture of butyl acetate/xylene/SOLVESSO 150 (in the same proportions as shown above) to a viscosity of about 18 seconds (20° C.) according to DIN 4, subsequent spraying onto a metal sheet, and exposure to air for 2 minutes at about 40° C. can be further coated with a clear unpigmented top coat comprised of:

| | |
|---|---|
| 53.3 grams | acrylic resin, 60% in xylene (VIACRYL VC 373-VIANORA) |
| 27.3 grams | melamine resin, 55% in butanol, (MAPRENAL MF-590-HOECHST) |
| 1.0 gram | SILICONE OIL A-1% in xylene (BAYER) |
| 1.0 gram | benzotriazole derivative (TINUVIN 900-CIBA-GEIGY AG) |
| 5.4 grams | xylene |
| 4.0 grams | SOLVESSO 150 (ESSO) |
| 3.0 grams | ethylene glycol acetate |

Exposure to air for 30 minutes at 40° C. and then stoving for 30 minutes at 135° C. will yield a bluish-red coating having excellent fastness properties.

EXAMPLE 30

This example illustrates the incorporation of the new gamma quinacridone according to Example 3A into a high solids enamel finish.

Pigment Dispersion Formulation

A 0.26 liter jar is charged with 42.2 grams of the pigment prepared according to Example 3A, followed by 66.0 grams of acrylic resin, 57.5 grams of xylene and 980 grams of 4 mm diameter steel diagonal rods. The mixture is milled in the jar for 64 hours on a roller mill. The dispersion contains 28% pigment and 56% solids at a pigment to binder ratio of 1.0.

Catalyst and Stabilizer Solution Preparation

A 4.2 liter jar with an impeller stirrer is charged with 755 grams ethyl acetate, 1177 grams UV-screener solution (contains benzotriazole UV absorber-TINUVIN 1130 from Ciba-Geigy Corp.) and 47.9 grams of an amine solution (N-propylamine in xylene, methanol, butanol). A mixture of 47.0 grams methanol and 113.8 grams dodecylbenzenesulfonic acid is added and the resulting solution is stirred for 20 minutes.

Paint Formulation 36.2 grams of above described Pigment Dispersion, 39.6 grams of acrylic resin, 28.4 grams of melamine resin and 20.8 grams of Catalyst and Stabilizer solution are mixed and diluted with xylene to a spray viscosity of 13-17 seconds using No. 4 FORD cup. The paint (masstone) is sprayed onto a primed aluminum panel exposed to ambient air for 10 minutes and stoved for 30 minutes at 130° C.

The red colored coating so obtained has excellent weatherability. The table below compares the color coatings of the new gamma modification with coatings prepared by a similar manner using MONASTRAL Red RT-759-D (CIBA-GEIGY Corp.) which shows the X-ray diffraction pattern of a γ-II-quinacridone.

The color is characterized by the following instrumental color readings obtained on a spectrophotometer using D65 illuminant, C.I.E. lab-scale and ten degree observer with specular component included, expressed in L,A,B color space values.

| Coating containing | L | A | B |
|---|---|---|---|
| New gamma form quinacridone | 39.9 | 42.2 | 20.4 |
| MONASTRAL Red RT-759-D | 38.2 | 39.4 | 16.6 |

The measured high L, A and B values of the new gamma quinacridone relative to the commercial sample are indicative of the lighter, brighter and yellower red color tone of the new γ-quinacridone vs. Monastral Red RT-759-D.

Summarizing, it is seen that this invention provides a new process for the direct oxidation of substituted and unsubstituted quinacridones to their pigmentary form. Variation may be made in proportions, procedures and materials without departing from the scope of the invention as defined by the following claims.

What is claimed is:

1. A process for preparing an unsubstituted or substituted quinacridone pigment or a solid solution of quinacridone pigments, which comprises the steps of:
    (a) oxidizing a precursor of the quinacridone pigment or solid solution by introducing a gas containing at least 2 percent by weight of molecular oxygen, above or below the surface of a solution, at a temperature from 50° C. to 90° C., said solution consisting essentially of the precursor, dimethyl sulfoxide, an alkali metal hydroxide, water and a catalytically effective amount of a quinone catalyst, the precursor being a 6,13-dihydroquinacridone with the same substitution as said quinacridone pigment or a mixture of 6,13-dihydroquinacridones with the same substitution as the quinacridone pigments in said solid solution, said dimethyl sulfoxide being present in an amount ranging from 3 to 20 times the weight of the precursor, said water being present in a concentration of 0.2 to 3.0 parts per part, by weight, of the precursor, and the molar ratio of the precursor to said alkali metal hydroxide being 1:1.9 to 1:7;
    (b) precipitating said quinacridone pigment or said solid solution from a solution resulting from step (a) by drowning in a $C_1-C_4$ alkanol in the presence or absence of a particle growth inhibitor; and
    (c) isolating said quinacridone pigment or said solid solution.

2. The process of claim 1, wherein said quinacridone corresponds to the formula

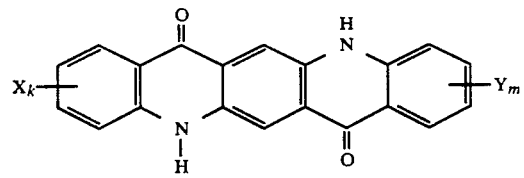

wherein X and Y are independently hydrogen, fluorine, chlorine, carboxyl, $C_1-C_3$ alkyl or $C_1-C_3$ alkoxy, and k and m are integers of from 0 to 2; and solid solutions of said quinacridones.

3. The process of claim 2, wherein said quinacridone is selected from the group consisting of quinacridone, 2,9-dichloroquinacridone, 3,10-dichloroquinacridone, 2,9-dimethylquinacridone, 4,11-dichloroquinacridone, 2,9-difluoroquinacridone, 2,9-dicarboxyquinacridone, 2,9-dimethoxyquinacridone, 2,9-dichloroquinacridone/quinacridone solid solution and 4,11-dichloroquinacridone/quinacridone solid solution.

4. The process of claim 1, wherein said gas is air.

5. The process of claim 1, wherein said quinone catalyst is selected from the group consisting of anthraquinone, mono-chloroanthraquinone, dichloroanthraquinone, anthraquinone-2-sulfonic acid and anthraquinone-2,6-disulfonic acid.

6. The process of claim 1, wherein said pigment particle growth inhibitor is a sulfonic acid, phthalimidomethyl-, imidazolylmethyl-, pyrazolylmethyl or dialkylaminoalkylsulfonamidequinacridone derivative.

7. The process of claim 6, wherein said particle growth inhibitor is quinacridonemonosulfonic acid, aluminum quinacridone mono- or disulfonate, or phthalimidomethylquinacridone.

8. The process of claim 1, wherein said particle growth inhibitor is present in a concentration of from 0.05 to 15%, based on the weight of the 6,13-dihydroquinacridone precursor.

9. The process of claim 1, wherein the isolated quinacridone pigment has an average particle size of less than about 0.1 μm.

10. A process of claim 1 wherein the precursor is 6,13-dihydroquinacridone and said quinacridone pigment is a yellowish-red pigment in gamma crystal form which exhibits an X-ray diffraction pattern having four strong lines corresponding to 2Θ double glancing angles of 6.7, 13.3, 14.0 and 26.6, one medium strength line corresponding to 13.6 and seven relatively weak lines corresponding 17.2, 20.6, 21.9, 24.0, 25.3, 28.1 and 28.8.

11. The process of claim 10, wherein said oxidizing gas is air.

12. The process of claim 10, wherein said dimethyl sulfoxide is present in an amount ranging from 5 to 20 times the weight of the 6,13-dihydroquinacridone.

13. A process of claim 10 wherein the pigment is precipitated by drowning a pigment salt solution resulting from step (a) into methanol at a temperature below about 40° C.

14. A process of claim 1 wherein said alkali metal hydroxide is selected from the group consisting of sodium hydroxide and potassium hydroxide.

15. A process of claim 1 wherein said quinone catalyst is present in an amount of from 0.005 to 0.15 times the weight of the precursor.

16. A process of claim 15 wherein said quinone catalyst is present in an amount of from 0.01 to 0.09 times the weight of the precursor.

17. A process of claim 1 wherein said dimethyl sulfoxide is present in an amount ranging from 4 to 10 times the weight of the precursor, said water is present in a concentration of 0.3 to 2.0 parts per part, by weight, of the precursor, and the molar ratio of the precursor to said alkali metal hydroxide is 1:2.1 to 1:5.5.

18. A process of claim 1 wherein the temperature is about 82° C.

19. A process of claim 1 wherein said quinacridone pigment is substituted.

20. A process for preparing a solid solution of quinacridone pigments, which comprises the steps of:
    (a) separately preparing a pigment salt solution of at least two different quinacridone pigments, each of the pigment salt solutions being prepared by oxidizing a precursor by introducing a gas containing at least 2 percent by weight of molecular oxygen, above or below the surface of a solution, at a temperature of from 50° C. to 90° C., said solution consisting essentially of dimethyl sulfoxide, the precursor, an alkali metal hydroxide, water and a catalytically effective amount of a quinone catalyst, the precursor being a 6,13-dihydroquinacridone with the same substitution as the different quinacridone pigments, said dimethyl sulfoxide being present in an amount ranging from 3 to 20 times the weight of the precursor, said water being present in a concentration of 0.2 to 3.0 parts per part, by weight, of the precursor, and the molar ratio of the precursor to said alkali metal hydroxide being 1:1.9 to 1:7;

(b) mixing the separately prepared pigment salt solutions;

(c) precipitating said solid solution by drowning the mixed pigment salt solutions in a $C_1$–$C_4$ alkanol in the presence or absence of a particle growth inhibitor; and (c) isolating said solid solution.

* * * * *